United States Patent
Liu et al.

(10) Patent No.: US 10,075,375 B2
(45) Date of Patent: Sep. 11, 2018

(54) METHOD FOR MAKING FLOW TABLE MULTIPLE LEVELS, AND MULTI-LEVEL FLOW TABLE PROCESSING METHOD AND DEVICE

(71) Applicant: ZTE Corporation, Shenzhen (CN)

(72) Inventors: Bin Liu, Shenzhen (CN); Yong Li, Shenzhen (CN); Xiaobing Niu, Shenzhen (CN); Depeng Jin, Shenzhen (CN); Zhongjin Liu, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 169 days.

(21) Appl. No.: 15/022,079

(22) PCT Filed: Sep. 26, 2014

(86) PCT No.: PCT/CN2014/087575
§ 371 (c)(1),
(2) Date: Mar. 15, 2016

(87) PCT Pub. No.: WO2015/035961
PCT Pub. Date: Mar. 19, 2015

(65) Prior Publication Data
US 2016/0226768 A1    Aug. 4, 2016

(30) Foreign Application Priority Data
Sep. 16, 2013  (CN) .......................... 2013 1 0422936

(51) Int. Cl.
*H04L 12/743* (2013.01)
*H04L 12/64* (2006.01)
(Continued)

(52) U.S. Cl.
CPC ...... *H04L 45/7457* (2013.01); *H04L 12/6418* (2013.01); *H04L 45/54* (2013.01);
(Continued)

(58) Field of Classification Search
CPC .. H04L 45/7457; H04L 45/54; H04L 12/6418
See application file for complete search history.

(56) References Cited

U.S. PATENT DOCUMENTS

2011/0038375 A1 *  2/2011  Liu ...................... H04L 45/7453
                                                          370/392
2013/0136127 A1 *  5/2013  Hill ..................... H04L 63/0245
                                                          370/392
(Continued)

FOREIGN PATENT DOCUMENTS

| CN | 102843299 A | 12/2012 |
| CN | 102957603 A | 3/2013 |
| CN | 103259718 A * | 8/2013 |

OTHER PUBLICATIONS

International Search Report of PCT/CN2014/087575, dated Dec. 29, 2014.

*Primary Examiner* — Hashim Bhatti
(74) *Attorney, Agent, or Firm* — Banner & Witcoff, Ltd.

(57) ABSTRACT

An embodiment of the present document discloses a flow table multi-leveling method, a multi-level flow table processing method and device; wherein the multi-leveling method includes: generating a second flow table, separating a target logic rule in a first flow table and forwarding actions corresponding the target logic rule to the second flow table, to make the first flow table and the second flow table orthogonal to form a ternary content addressable memory (TCAM) flow table; wherein the first flow table saves a plurality of logic rules and all forwarding actions corresponding to the plurality of logic rules respectively; continuously generating new flow tables in the same manner of generating the second flow table, until the number of flow tables reaches a preset upper limit.

14 Claims, 5 Drawing Sheets

| First flow table ||| | Second flow table ||| | Third flow table ||| | |
|---|---|---|---|---|---|---|---|---|---|---|---|
| Priority/ forwarding action | IP Src | $J_1$ | | Priority/ forwarding action | Eth Dst | $J_2$ | | Priority/ forwarding action | IP Dst | $J_3$ | ACTION |
| R1 | 001* | 2 | | R1 | 00:FF | 3 | | R1 | 01* | 4 | ACT1 |
| R2 | 00* | 2 | | R2 | 00:10 | 4 | | R3 | 11* | 4 | ACT2 |
| R3 | 0* | 2 | | R3 | 00:1F | 3 | | R4 | 111* | 4 | ACT3 |
| R4 | * | 2 | | R4 | 00:33 | 3 | | R5 | 10* | 4 | ACT4 |
| R5 | 10* | 3 | | R5-R10 | * | 3 | | R7、R9 | 1* | 4 | ACT5 |
| R6 | 110* | 3+1=4 | | | | | | R2\6\8\10 | * | 4 | ACT6 |
| R7 | 1100* | 3 | | | | | | | | | ACT7 |
| R8 | 11011* | 3+1=4 | | | | | | | | | ACT8 |
| R9 | * | 3 | | | | | | | | | ACT9 |
| R10 | 11* | 3+1=4 | | | | | | | | | ACT10 |

(51) Int. Cl.
*H04L 12/741* (2013.01)
*H04L 12/715* (2013.01)
*H04L 12/747* (2013.01)

(52) U.S. Cl.
CPC .............. *H04L 45/64* (2013.01); *H04L 45/74* (2013.01); *H04L 45/742* (2013.01)

(56) References Cited

U.S. PATENT DOCUMENTS

| | | | | |
|---|---|---|---|---|
| 2013/0272305 | A1* | 10/2013 | Lefebvre | H04L 47/24 370/392 |
| 2014/0006706 | A1* | 1/2014 | Wang | G06F 17/30982 711/108 |
| 2015/0131666 | A1* | 5/2015 | Kang | H04L 45/745 370/392 |
| 2015/0304212 | A1* | 10/2015 | Zhou | H04L 45/7457 370/392 |
| 2016/0006650 | A1* | 1/2016 | Song | H04L 12/6418 370/329 |
| 2017/0163570 | A1* | 6/2017 | Casado | H04L 49/25 |

\* cited by examiner

| Priority | Lookup field Eth type | Lookup field IP protocol | Action table |
|---|---|---|---|
| 1 | 0x8100 | * | ACT1 |
| 2 | 0x8100 | TCP | ACT2 |
| 3 | 0x8100 | * | ACT3 |
| 4 | 0x8100 | TCP | ACT4 |
| 5 | * | * | ACT5 |
| 6 | * | UDP | ACT6 |

METHOD FOR MAKING FLOW TABLE MULTIPLE LEVELS, AND MULTI-LEVEL FLOW TABLE PROCESSING METHOD AND DEVICE

TECHNICAL FIELD

The present document relates to the field of networks, provides a flow table multi-leveling method, and a multi-level flow table processing method and device.

BACKGROUND OF THE RELATED ART

Currently, with the rapid development of the Internet, its large-scale application and its status importance are far beyond the imagination of its designers, now the Internet has the following drawbacks: there is no unified management within a specific range, the network forwarding mechanism and strategy are simple, and it is difficult for the operators to maximally optimize their own networks, moreover, forwarding functions and protocols of traditional switches are many and complex, and difficult to configure, and the system is error-prone. To deal with these drawbacks, the Openflow switch was proposed, and it separates the packet forwarding from the forwarding policy in the traditional switch, and uses a specific forwarder to connect with the switch through a network cable. Therefore, the packet forwarding functions (implemented by hardware chips) and packet forwarding policies (various software protocols) which are originally in the same switch device are separated to different hardware devices. Moreover, a forwarder can also control multiple Openflow switches, so as to achieve a unified forwarding control terminal, thus controlling the network more effectively.

Usually, flow tables in an Openflow switch are implemented by configuring the flow tables in a TCAM (Ternary Content Addressable Memory) hardware. Wherein, the TCAM is mainly used to quickly look up table entries such as ACL and routing.

In the related art, the Openflow switch only has one TCAM flow table, assuming that the Openflow switch needs to define M kinds of IP forwarding rules based on the destination IP field of the packet, while to execute N kinds of port filtering rules based on the TCP field of the data packet, then TCAM flow table needs to have M×N entries, which takes up too much TCAM storage space.

SUMMARY

The embodiment of the present document provides a flow table multi-leveling solution and a multi-level flow table processing solution, to effectively save Ternary Content Addressable Memory (TCAM) storage space, and further save the manufacturing cost of an Openflow switch.

A flow table multi-leveling method, comprises:
generating a second flow table, separating a target logic rule in a first flow table as well as forwarding actions corresponding to the target logic rule to the second flow table, to make the first flow table and the second flow table orthogonal to form a TCAM flow table; wherein the first flow table saves a plurality of logic rules as well as all forwarding actions corresponding to the plurality of logic rules respectively;
continuously generating new flow tables in a same manner of generating the second flow table, until a number of flow tables reaches a preset upper limit.

Alternatively, logic rules in the first flow table and the second flow table comprise one or more match fields, and each match field corresponds to one or more forwarding actions;
the step of separating the target logic rule in the first flow table as well as forwarding actions corresponding to the target logic rule to the second flow table comprises:
calculating mapping gains of all logic rules in the first flow table, and determining a logic rule with a maximum mapping gain as the target logic rule;
separating the target logic rule in the first flow table as well as all the forwarding actions corresponding to the target logic rule to the second flow table; wherein, a same match field of the target logic rule is not repeatedly saved in the second flow table.

Alternatively, continuously generating new flow tables in a same manner of generating the second flow table comprises:
calculating mapping gains of all remaining logic rules in the first flow table, determining a logic rule with a maximum mapping gain in the remaining logic rules in the first flow table as a new target logic rule;
separating the new target logic rule in the first flow table as well as all forwarding actions corresponding to the new target logic rule to a third flow table, to make the first flow table, the second flow table and the third flow table orthogonal to form a TCAM table; wherein a same match field of the target logic rule is not repeatedly saved in the third flow table.

Alternatively, the first flow table is configured with a first jump flow entry used for saving a jump address of each forwarding action in the first flow table, the second flow table is configured with a second jump flow entry used for saving a jump address of each forwarding action in the second flow table; wherein, a jump address of the first jump flow entry is the second flow table or a forwarder, the jump address of the second jump flow entry is the forwarder;
after separating the new target logic rule in the first flow table as well as all forwarding actions corresponding to the new target logic rule to the third flow table, the method further comprises:
configuring a third jump flow entry for the third flow table;
configuring a jump address for each forwarding action in the third flow table;
saving the jump address of each forwarding action in the third flow table to the third jump flow entry;
updating jump addresses in the first jump flow entry and the second jump flow entry.

Alternatively, the step of configuring a jump address for each forwarding action in the third flow table comprises:
configuring the jump address of each forwarding action in the third flow table as the forwarder;
the step of updating jump addresses in the first jump flow entry and the second jump flow entry comprises:
updating the jump addresses in the first jump flow entry and the second jump flow entry, to make the jump address of the first jump flow entry be the second flow table or the third flow table or the forwarder, and make the jump address of the second jump flow entry be the third flow table or the forwarder.

A multi-level flow table processing method, comprising:
determining a logic rule of a target packet;
matching logic rules saved in each flow table with the logic rule of the target packet based on an order of valid bits to obtain a set of forwarding actions of each flow table consistent with the matching;

taking an intersection of sets of forwarding actions of all the flow tables to obtain common forwarding actions for each set of forwarding actions;

forwarding the target packet based on the common forwarding actions for each set of forwarding actions;

wherein, the multi-level flow tables are sequenced based on the valid bits, the multi-level flow tables are orthogonal to form a ternary content addressable memory (TCAM) flow table; a first flow table at a first level saves at least one logic rule and all forwarding actions corresponding to the at least one logic rule, and each of remaining flow tables only saves one logic rule and all forwarding actions corresponding to the logic rule.

Alternatively, the logic rules saved in each flow table comprise one or more match fields, each match field corresponds to one or more forwarding actions; each flow table in the multi-level flow tables is further configured with a jump flow entry used for saving a jump address of each forwarding action in a flow table corresponding to the jump flow entry, thereby after obtaining a set of forwarding actions of the first flow table, it is to jump to a lower-level flow table based on the jump address corresponding to each forwarding action in the set of forwarding actions.

Alternatively, the method further comprises:

when it is needed to change the sequence of the multi-level flow tables, exchanging a flow table that needs to be changed as well as all forwarding actions corresponding to the flow tables, and updating jump flow entries of all the flow tables.

Alternatively, the method further comprises:

when it is needed to replace a target flow table in the multi-level flow tables, generating a replacement flow table, saving a logic rule that needs to be replaced in the replacement flow table, and replacing the target flow table with the replacement flow table, then configuring forwarding actions of logic rules in the replacement flow table, and updating jump flow entries of all the flow tables.

A flow table multi-leveling device, comprising: a generating module, configured to: generate a second flow table; and a separating module, configured to separate a target logic rule in the first flow table as well as forwarding action corresponding to the target logic rule to the second flow table, to make that the first flow table and the second flow table orthogonal to form a TCAM flow table; wherein the first flow table saves a plurality of logic rules as well as all forwarding actions corresponding to the plurality of logic rules respectively;

the generating module is further configured to: continuously generate new flow tables in a same manner of generating the second flow table, until a number of flow tables reaches a preset upper limit.

Alternatively, logic rules in the first flow table and the second flow table comprise one or more match fields, and each match field corresponds to one or more forwarding actions;

the separating module comprises:

a calculating sub-module, configured to: calculate mapping gains of all logic rules in the first flow table, and determine a logic rule with a maximum mapping gain as the target logic rule; and a separating sub-module, configured to: separate the target logic rule in the first flow table as well as all forwarding actions corresponding to the target logic rule to the second flow table; wherein, a same match field of the target logic rule is not repeatedly saved in the second flow table.

Alternatively, the calculating sub-module is further configured to: calculate mapping gains of all remaining logic rules in the first flow table, determine a logic rule with a maximum mapping gain in the remaining logic rules in the first flow table as a new target logic rule;

the separating sub-module is further configured to: separate the new target logic rule in the first flow table and all forwarding actions corresponding to the new target logic rule to a third flow table, to make the first flow table, the second flow table and the third flow table orthogonal to form a TCAM table; wherein, a same match field of the target logic rule is not repeatedly saved in the third flow table.

Alternatively, the first flow table is configured with a first jump flow entry used for saving a jump address of each forwarding action in the first flow table, the second flow table is configured with a second jump flow entry used for saving a jump address of each forwarding action in the second flow table; wherein, a jump address of the first jump flow entry is the second flow table or a forwarder, and a jump address of the second jump flow entry is the forwarder;

the device further comprises:

a first configuring module: configured to: after the separating module separates the target logic rule in the first flow table as well as all forwarding actions corresponding to the target logic rule to the third flow table, configure a third jump flow entry for the third flow table;

a second configuring module, configured to configure a jump address for each forwarding action in the third flow table;

a saving module, configured to: save the jump address of each forwarding action in the third flow table into the third jump flow entry; and an updating module, configured to: update jump addresses in the first jump flow entry and the second jump flow entry.

Alternatively, the second configuring module is configured to: configure the jump address of each forwarding action in the third flow table as the forwarder;

the updating module is configured to: update the jump addresses in the first jump flow entry and the second jump flow entry, to make the jump address of the first jump flow entry be the second flow table or the third flow table or the forwarder, and make the jump address of the second jump flow entry be the third flow table or the forwarder.

A multi-level flow table processing device, wherein, the device comprises:

a determining module, configured to determine a logic rule of a target packet;

a matching module, configured to match logic rules saved in each flow table with the logic rule of the target packet based on an order of valid bits to obtain a set of forwarding actions of each flow table consistent with the match;

a processing module, configured to take an intersection of sets of forwarding actions of all the flow tables to obtain common forwarding actions for each set of forwarding actions; and a forwarding module, configured to forward the target packet based on the common forwarding actions for each set of forwarding actions;

wherein, the multi-level flow tables are sequenced based on the valid bits and are orthogonal to form a ternary content addressable memory (TCAM) flow table; wherein, a first flow table at a first level saves at least one logic rule and all forwarding actions corresponding to the at least one logic rule, and each of remaining flow tables only saves one logic rule and all forwarding actions corresponding to the logic rule.

Alternatively, the logic rules saved in each flow table comprise one or more match fields, each match field corresponds to one or more forwarding actions; each flow table in the multi-level flow tables is further configured with a jump flow entry used for saving a jump address of each forwarding action in a flow table corresponding to the jump flow entry, thereby after obtaining a set of forwarding actions of the first flow table, the matching module can jump to a lower-level flow table based on the jump address corresponding to each forwarding action in the set of forwarding actions.

Alternatively, the device further comprises:

a flow table exchanging module, configured to: when it is needed to change the sequence of the multi-level flow tables, exchange a flow table that needs to be changed as well as all forwarding actions corresponding to the flow tables, and update jump flow entries of all the flow tables.

Alternatively, the device further comprises:

a flow table replacing module, configured to: when it is needed to replace a target flow table in the multi-level flow tables, generate a replacement flow table, save a logic rule that needs to be replaced in the replacement flow table, and replace the target flow table with the replacement flow table, then configure forwarding actions of logic rules in the replacement flow table, and update jump flow entries of all the flow tables.

The embodiment of the present document further provides a computer program, comprising program instructions which when executed by a flow table multi-leveling device, enable the device to execute the abovementioned method.

The embodiment of the present document further provides a computer program, comprising program instructions which, when executed by a multi-level flow table processing device, enable the device to execute the abovementioned method.

The embodiment of the present document further provides carriers carrying the abovementioned computer programs.

With the embodiment of the present document, a plurality of logic rules in a TCAM flow table maintained by an Openflow switch are separated out one by one, so that each newly-generated flow table saves one separated logic rule, thus the logic rules in the TCAM flow table are orthogonally decomposed, which can effectively save the TCAM storage space and further save the manufacturing cost of the Openflow switch.

PREFERRED EMBODIMENTS OF THE INVENTION

Figures 1, 2:
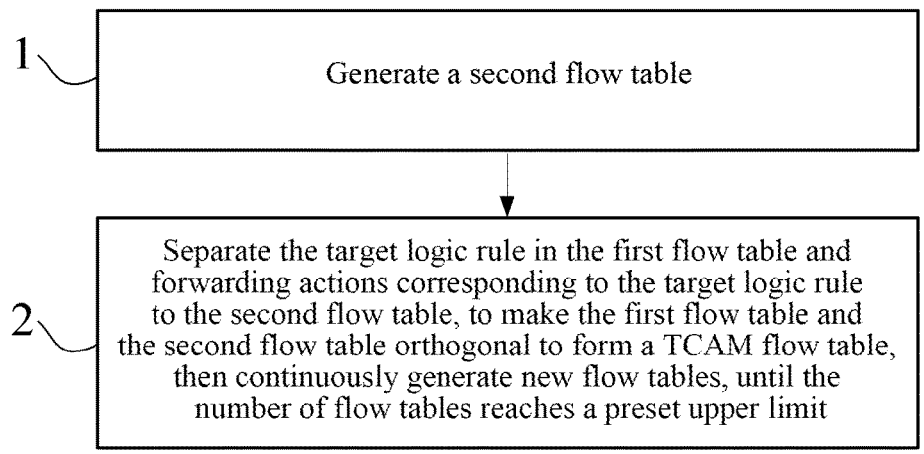
FIG. 1 is a schematic diagram of steps of a flow table multi-leveling method in accordance with an embodiment of the present document.
FIG. 2 is a specific schematic diagram of a TCAM flow table in the related art.

Hereinafter, in conjunction with the accompanying drawings, the specific embodiments of the present document will be described in detail. In the case of no conflict, embodiments and features in the embodiments of the present application may be combined arbitrarily with each other. The method of the present embodiment can be executed in a switch.

A flow table multi-leveling method, comprises:

in step 1, it is to generate a second flow table, in step 2, it is to separate the target logic rule in the first flow table and forwarding actions corresponding to the target logic rule to the second flow table, to make the first flow table and the second flow table orthogonal to form a TCAM flow table; and then continuously generate new flow tables in the same manner of generating the second flow table, until the number of flow tables reaches a preset upper limit; wherein the first flow table saves a plurality of logic rules as well as all forwarding actions respectively corresponding to the plurality of logic rules.

With the present method, a plurality of logic rules in a TCAM flow table maintained by an Openflow switch are separated out one by one, so that each newly-generated flow table saves one separated logic rule, thus the logic rules in the TCAM flow table are orthogonally decomposed, which can effectively save the TCAM storage space and further save the manufacturing cost of the Openflow switch.

In step 2, it is to separate the target logic rule in the first flow table as well forwarding actions corresponding to the target logic rule to the second flow table, comprising:

in step 21, it is to calculate mapping gains of all the logic rules in the first flow table, and determine the logic rule with the maximum mapping gain as the target logic rule;

assuming that the original first flow table comprises N logic rules whose width is W, and each logic rule comprises M match fields $\{F_i, i=1, \ldots, m\}$, considering that the logic rules repeated in each match field Fi can be divided into $d(F_i)$ categories, the set of repeated logic rules is $F_i'=\{(F_i')_j, j=1, \ldots, d(F_i)\}$, the number of repetitions of each repeated logic rule is $\{RE(F_i'), j=1, \ldots, d(F_i)\}$, the corresponding logic rule is using properties of the multi-level flow tables, the repeated logic rules can be saved separately in a relatively small TCAM space of the first-level flow table, which is called mapping. In this process, in order to maintain the logic relationship of the flow tables, it needs to save additional variables $RE(F_i')_j$ to indicate the affiliation of the current logic rule, for looking for lower levels, assuming that the storage width of each variable is C, the gain of mapping one repeated logic rule everytime is defined as the saved storage resource: $P(F_i)_j=(RE(F_i')_j-1)W-(RE(F_i'))C$. Therefore, the equation for calculating the mapping gain of all the logic rules is:

$$P(F_i) = \sum_{j=1}^{d} P(F_i')_j = \sum_{j=1}^{d} (RE(F_i')_j - 1)W - NC$$

in step 22, it is to separate the target logic rule in the first flow table as well as all the forwarding actions corresponding to the target logic rule to the second flow table; wherein, the same match field of the target logic rule is not repeatedly saved in the second flow table.

In addition, on the basis of the abovementioned embodiments, the embodiment of the present document further provides a method for specifically dividing a TCAM flow into multiple flow tables, wherein, the logic rules in the first flow table and the second flow table specifically comprise one or more match fields, and each match field corresponds to one or more forwarding actions; it can continuously generate the third flow table in step 2, comprising:

in step 31, it is to calculate mapping gains of all the remaining logic rules in the first flow table, and determine the logic rule with the maximum mapping gain as the new target logic rule;

in step 32, it is to separate the new target logic rule in the first flow table and all the forwarding actions corresponding to the target logic rule to the third flow table; wherein the same match field of the target logic rule is not repeatedly saved in the third flow table.

As shown in FIG. 2, for the current TCAM flow table, its lookup conditions are the logic rules described above, and a match field (i.e. a specific address) in one lookup condition may correspond to multiple forwarding actions (such as the match field 0x8100 in the lookup condition Eth type in FIG. 2), therefore the TCAM flow table will create more entries used for repeatedly saving the match fields (if a same match field corresponds to several forwarding actions, it will be repeatedly saved in the TCAM flow table for several times); in addition, if the number of generated flow tables is too large, the jump time between the flow tables will be longer, resulting in a reduced packet forwarding speed, therefore, by only saving one abovementioned repeated match field, the present embodiment separates a logic rule with a large mapping gain from the TCAM flow table in the case that the number of flow tables is limited (in one lookup condition, the repetition degree of its match field is the mapping gain of the lookup condition), thereby rationally saving resources of the TCAM flow table.

In addition, in order to ensure a more flexible jump between the flow tables, in the abovementioned embodiments of the present document, the first flow table is configured with a first jump flow entry used for saving the jump address of each forwarding action in the first flow table, and the second flow table is configured with a second jump flow entry used for saving the jump address of each forwarding action in the second flow table; wherein the jump address of the first jump flow entry is the second flow table or the forwarder, and the jump address of the second jump flow entry is the forwarder; after generating the third flow table, the flow table multi-leveling method further comprises:

in step 3, it is to configure a third jump flow entry for the third flow table;

in step 4, it is to configure a jump address for each forwarding action in the third flow table;

in step 5, it is to save the jump address of each forwarding action in the third flow table into the third jump flow entry;

in step 6, it is to update the jump addresses in the first jump flow entry and the second jump flow entry.

The present embodiment introduces a jump flow entry of jump address into each flow table, so as to jump based on the jump address in the jump flow entry, and there is no need to go through the flow tables one by one to obtain the forwarding actions, thus saving the time needed for the packet forwarding.

Specifically, in the abovementioned embodiments of the present document, the step 3 comprises:

configuring the jump address of each forwarding action in the third flow table as a forwarder;

the step 6 comprises:

updating the jump addresses in the first jump flow entry and the second jump flow entry, to make the jump address of the first jump flow entry be the second flow table or the third flow table or the forwarder, and make the jump address of the second jump flow entry be the third flow table or the forwarder.

The present embodiment sets the jump address of all the forwarding actions in the last flow table (i.e. the current third flow table) as the forwarder, and after going through the last flow table, the packets can be forwarded directly through the forwarder, since the last flow table will change every time a new flow table is added afterwards, it needs to update the jump flow entries in the former first flow table and the second flow table.

Figure 3:
FIGS. 3-5 are schematic diagrams of specific implementations of the flow table multi-leveling method in accordance with an embodiment of the present document.

Next, the specific embodiments of the abovementioned flow table multi-leveling method will be described in detail:

as shown in FIG. 3, assuming that the original TCAM flow table is a flow table with 10 entries, and each entry corresponds to three logic rules (that is, the lookup condition Eth Dst\IP Src\IP Dst), each entry in the TCAM flow table corresponds to its own forwarding action, that is, the forwarding actions ACT1-ACT10 in the ACTION table (forwarder).

In the first step, the table entries are sequenced based on their priorities, herein, they are marked as R1 to R10 (i.e., an entry with a smaller serial number has higher priority) according to the sequence of the priorities; wherein the R1 to R10 respectively correspond to the forwarding actions ACT1-ACT10.

Figure 4:

In the second step, it is to calculate the mapping gains of all the logic rules, and according to the examples in FIG. 3, the lookup condition Eth Dst has the maximum mapping gain (i.e., the repetition degree of the match field is the highest);

In the third step, shown in FIG. 4, it is to generate a second flow table, separate the match field Eth Dst (carrying its corresponding forwarding actions, that is, the rules R1-R4 and R5-R10) in the first flow table (the original TCAM flow table) to the second flow table (only one repeated match field is saved), and maintain a variable J1 (that is, the abovementioned jump flow entry) to indicate the jump address of the first flow table, wherein, the value of J1 is determined by the match field of the Eth Dst, and because the R5-R10 of the Eth Dst are any match "*" ("*" matches all values), in the packet forwarding process, if the forwarding actions corresponding to the R5-R10 are determined through the first flow table, there is no need to look up in the second flow table, and it can directly jump to the action table, for example, the specific match field is 00:FF, then it corresponds to 2 in the J1 (the second flow table whose level is 2).

Thereafter, it is to create a variable J2 for the second flow table (the jump flow entry in the second flow table), because the second flow table at this time is the last flow table, all the jump addresses of the match fields corresponding to the J2 can point to 3 (3 corresponds to the ACTION table).

Figure 5:
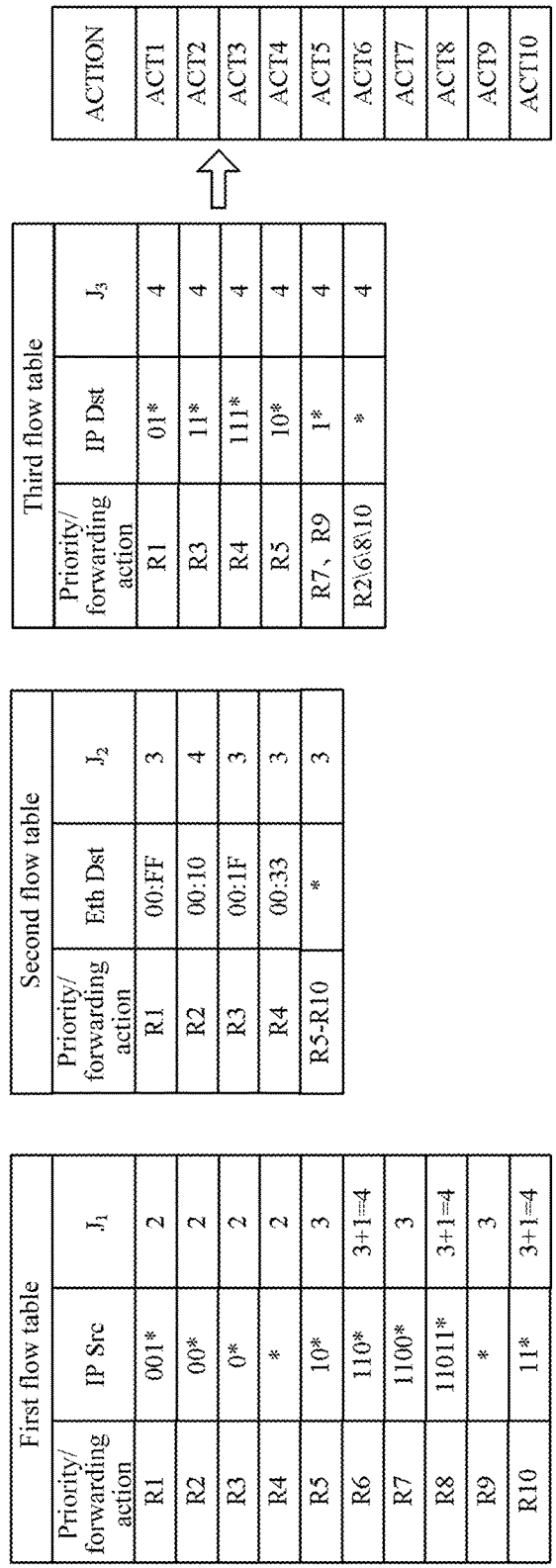
Figure 6:
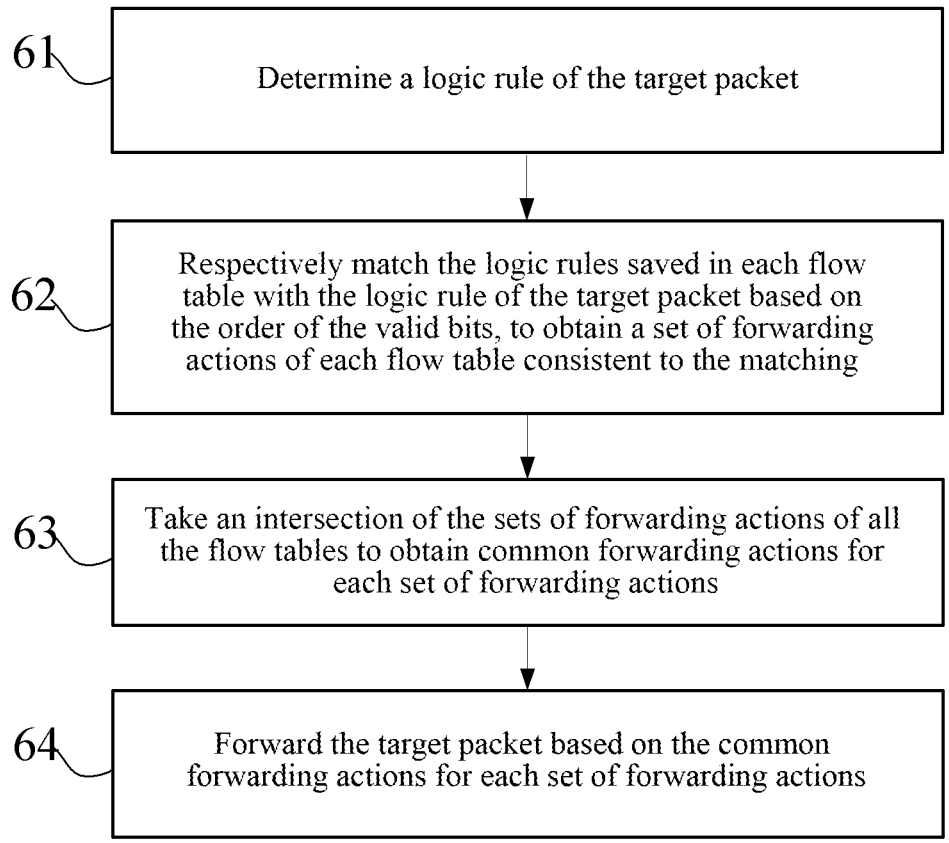
FIG. 6 is a schematic diagram of steps of a multi-level flow table processing method in accordance with an embodiment of the present document.

In the fourth step, the logic rule IP Dst has the second-highest gain value based on the mapping gains, and similar to the third step, it is to generate the third flow table, separate the IP Dst in the first flow table to the third flow table, thereafter, configure the third flow table with the jump flow entry J3, because at this time the third flow table is the last flow table, the J3 corresponding to the match field of the IP Dst is set to 4, and update the J1 and the J2, finally obtain the multi-level flow tables shown in FIG. 5. For example, the R5 in the Eth Dst corresponds to any match "*", while the R5 of the IP Dst corresponds to 10*, therefore 10* cannot be applied to any value, the jump address of the R5 corresponding to the J1 should skip the second flow table and arrives at the third flow table, because the level corresponding to the third flow table is 3, the R5 is still 3 in the J1, but it represents a different meaning from the original 3 (the original 3 represents jumping to the ACTION table); while the R6, R8, R10 are any match "*" in the Eth Dst and the IP Dst, so they correspond to 4 in the J1 (that is, jumping directly to the ACTION table); with respect to the match fields of the J2, the R2 in the IP Dst is any match "*", therefore, the J2 corresponding to the R2 is changed to 4 (that is, after skipping the third flow table, it is to come to the ACTION table).

It should be noted that the present embodiment defines lookup conditions as logic rules, which is only one preferred embodiment therein, for the original TCAM flow table, each of its longitudinal entries as well as each of its transversal entries can be used as a logic rule for separating, the separation principle is the same as the method proposed in the present embodiment and will not be repeated herein. In addition, for the case that the original TCAM flow table saves a plurality of logic rules, the time required for forwarding the packets can be weighed to set the appropriate number of logic rules to be separated.

In addition, the embodiments of the present document further provides a multi-level flow table processing method, the multi-level flow tables are sequenced based on the valid bits and can be orthogonal to form a ternary content addressable memory (TCAM) flow table; wherein, the first flow table located in the first level saves at least one logic rule as well as all the forwarding actions corresponding to the at least one logic rule, each of the remaining flow tables only saves one logic rule as well as all the forwarding actions corresponding to the one logic rule; the method comprises:

in step 61, it is to determine a logic rule of the target packet;

in step 62, it is to respectively match the logic rules saved in each flow table with the logic rule of the target packet based on the order of the valid bits, to obtain a set of forwarding actions of each flow table consistent to the matching;

in step 63, it is to take an intersection of the sets of forwarding actions of all the flow tables to obtain common forwarding actions for each set of forwarding actions;

in step 64, it is to forward the target packet based on the common forwarding actions for each set of forwarding actions.

The abovementioned embodiment provides a multi-level flow table processing method, obtains a corresponding set of forwarding actions with one or more forwarding actions based on the logic rules in each flow table, takes an intersection of the obtained sets of forwarding actions in each flow table to obtain forwarding actions in compliance with the logic rules saved in all the flow tables, thus completing the packet forwarding.

Furthermore, in the abovementioned embodiments of the present document, the logic rules saved in each flow table specifically comprise one or more match fields, and each match field corresponds to one or more forwarding actions; each flow table in the multi-level flow tables is also provided with a jump flow entry used for saving the jump address of each forwarding action in its corresponding flow table, thereby, after obtaining the set of forwarding actions in the first flow table, it is able to jump to the lower-level flow table based on the jump address corresponding to each forwarding action in the set of forwarding actions.

The present embodiment saves the corresponding jump addresses for the forwarding actions in each flow table, thereby directly jumping to the lower-level flow table based on the jump address without going through the flow tables one by one to obtain the forwarding actions, thus reducing the time needed for the packet forwarding.

Furthermore, in the abovementioned embodiments of the present document, the method further comprises:

in step 65, when it is needed to change the sequence of the multi-level flow tables, it is to exchange a flow table to be changed as well as all the forwarding actions corresponding to the flow table, and update the jump flow entries of all the flow tables.

Furthermore, in order to change the flow tables, in the abovementioned embodiments of the present document, the method further comprises:

in step 66, when it is needed to replace the target flow table in the multi-level flow tables, it is to generate a replacement flow table, save a logic rule that needs to be replaced in the replacement flow table, and replace the target flow table with the replacement flow table, then configure the forwarding actions of the logic rules in the replacement flow table, and update the jump flow entries of all the flow tables.

Next, the specific implementation process of the multi-level flow table processing method will be described in detail:

<Packet Forwarding Process>

Similarly, as the multi-level flow tables shown in FIG. 5, assuming that the target packet is received from the input port, its three data fields (i.e., logic rules of the target packet) are "00:1F", "0010*" and "1110*". The three data fields are extracted and sent to the three flow tables for looking up, to obtain a set of forwarding actions of the entries R1, R2, R3, R4, R9 corresponding to the match field in the first flow table (such as 001* in the R1, wherein * may correspond to any value, when * is 0*, the R1 in the first flow table is 0010*, which is in line with the data field of the target packet), then the J1 corresponding to the R1, R2, R3, R4, R9 jumps, and finally it is to find the set of corresponding forwarding actions from the second flow table: the R3 as well as the R5-R10 corresponding to "*"; find the set of corresponding forwarding actions from the third flow table: R3, R4, R7, R9, and R2, R6, R8, R10 corresponding to "*". Thereafter it is to take the intersection of the sets of forwarding actions obtained from each flow table to finally determine that the R3 and the R4 comply with the logic rules in all the flow tables, since each entry in the multi-level flow table shown in FIG. 5 is sequenced based on its priority, herein it can be determined that the forwarding actions corresponding to the R3 have the highest priority, and finally the packet forwarding operation is performed on the forwarding actions corresponding to the R3.

<Flow Table Changing Process> the flow table changing process is divided into two cases: in the first case, only the sequence of the multi-level flow tables changes, assuming that there are three flow tables, 1-4 represent three flow tables and one action table respectively. The updating process has three steps: in the first step, the jump flow entries in all the flow tables are recovered to their default values, that is, there is no jump address; in the second step, the flow tables are exchanged. In the third step, it is to update the jump address in the jump flow entry corresponding to each flow table, its updating way is consistent with the way described above and is not repeated herein.

The second case is that a logic rule in a flow table changes, for example, a logic rule saved in the third flow table needs to be changed, a new flow table can be generated as a replacement table, a logic rule that needs to be changed is saved in the replacement flow table, the third flow table is replaced by the replacement flow table, thereafter, the jump flow entries of all the flow tables are updated, to achieve the replacement of the third flow table.

Figure 7:
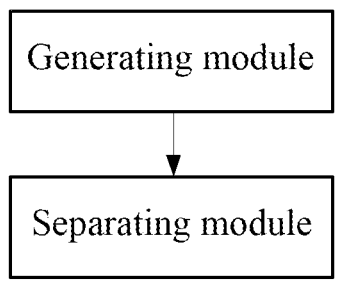
FIG. 7 is a schematic diagram of the structure of a flow table multi-leveling device in accordance with an embodiment of the present document.

In addition, as shown in FIG. 7, the embodiment of the present document further provides a flow table multi-leveling device, comprising:

a generating module, configured to: generate a second flow table; and a separating module, configured to separate the target logic rule in the first flow table as well as forwarding action corresponding to the target logic rule to the second flow table, to make the first flow table and the second flow table orthogonal to form a TCAM flow table; wherein the first flow table saves a plurality of logic rules as well as all the forwarding actions respectively corresponding to the plurality of logic rules;

the generating module is further configured to: continuously use the separating module to generate new flow tables in the same manner of generating the second flow table, until the number of flow tables reaches a preset upper limit.

The present device separates a plurality of logic rules in a TCAM flow table maintained by an Openflow switch one by one, so that each newly-generated flow table saves one separated logic rule, thus the logic rules in the TCAM flow table are orthogonally decomposed, which can effectively save the TCAM storage space and further save the manufacturing cost of the Openflow switch.

Wherein, in the above mentioned embodiments of the present document, the logic rules in the first flow table and the second flow table comprise multiple match fields, and each match field corresponds to one or more forwarding actions; the separating module comprises:

a calculating sub-module, configured to: calculate mapping gains of all the logic rules in the first flow table, and determine the logic rule with the maximum mapping gain as the target logic rule; and a separating sub-module, configured to: separate the target logic rule in the first flow table and all the forwarding actions corresponding to the target logic rule to the second flow table; wherein, the same match field of the target logic rule is not repeatedly saved in the second flow table.

The calculating sub-module is further configured to: calculate mapping gains of all the remaining logic rules in the first flow table, determine the logic rule with the maximum mapping gain in the remaining logic rules in the first flow table as the new target logic rule;

the separating sub-module is further configured to: separate the new target logic rule in the first flow table and all the forwarding actions corresponding to the new target logic rule to the third flow table, to make the first flow table, the second flow table and the third flow table are orthogonal to form a TCAM table; wherein, the same match field of the target logic rule is not repeatedly saved in the third flow table.

Wherein, in the abovementioned embodiments of the present document, the first flow table is configured with a first jump flow entry used for saving the jump address of each forwarding action in the first flow table, the second flow table is configured with a second jump flow entry used for saving the jump address of each transponder operation in the second flow table; wherein, the jump address of the first jump flow entry is the second flow table or the forwarder, and the jump address of the second jump flow entry is the forwarder;

the device further comprises:

a first configuring module: configured to: after the separating module separates the target logic rule in the first flow table as well as all the forwarding actions corresponding to the target logic rule to the third flow table, configure a third jump flow entry for the third flow table;

a second configuring module, configured to configure a jump address for each forwarding action in the third flow table;

a saving module, configured to: save the jump address of each forwarding action in the third flow table to the third jump flow entry; and an updating module, configured to: update the jump addresses in the first jump flow entry and the second jump flow entry.

Wherein, in the abovementioned embodiments of the present document, the second configuring module is configured to: configure the jump address of each forwarding action in the third flow table as the forwarder;

the updating module is configured to: update the jump addresses in the first jump flow entry and the second jump flow entry, to make the jump address of the first jump flow entry be the second flow table or the third flow table or the forwarder, and make the jump address of the second jump flow entry be the third flow table or the forwarder.

Apparently, the device of the present embodiment corresponds to the flow table multi-leveling method in the embodiment of the present document, and the technical effects achieved in the flow table multi-leveling method can also be achieved by the device of the present embodiment.

Figure 8:
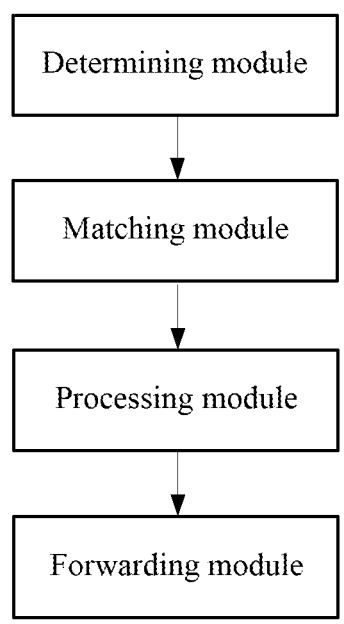
FIG. 8 is a schematic diagram of the structure of a multi-level flow table processing device in accordance with an embodiment of the present document.

In addition, the embodiment of the present document provides a multi-level flow table processing device, wherein the multi-level flow tables can be sequenced based on their valid bits and can be orthogonal to form a ternary content addressable memory (TCAM) flow table; wherein, the first flow table located in the first level saves at least one logic rule as well as all the forwarding actions corresponding to the at least one logic rule, and each of the remaining flow tables only saves one logic rule as well as all the forwarding actions corresponding to the one logic rule; as shown in FIG. 8, the device comprises:

a determining module, configured to determine a logic rule of a target packet;

a matching module, configured to match logic rules saved in each flow tables with the logic rule of the target packet based on the order of the valid bits, to obtain a set of forwarding actions of each flow table consistent with the match;

a processing module, configured to take the intersection of sets of the forwarding actions of all the flow tables, to obtain the common forwarding actions for each set of forwarding actions;

a forwarding module, configured to forward the target packet based on the common forwarding actions for each set of forwarding actions;

The abovementioned embodiment provides a multi-level flow table processing device to obtain a set of corresponding forwarding actions with one or more forwarding actions based on the logic rules in each flow table, and take an interaction of the obtained set of forwarding actions in each flow table, thus obtaining the corresponding forwarding actions in line with the logic rules saved in all the flow tables, so as to complete the packet forwarding.

Wherein, in the abovementioned embodiments of the present document, the logic rules saved in each flow table comprise multiple match fields, and each match field corresponds to one forwarding action; each flow table in the multi-level flow table is further configured with a jump flow entry used for saving the jump address of each forwarding action in its corresponding flow table, thereby, after obtaining the set of forwarding actions of the first flow table, the matching module can jump to the lower-level flow table based on the jump address corresponding to each forwarding action in the set of forwarding actions.

Wherein, in the abovementioned embodiments of the present document, the device further comprises:

a flow table exchanging module, configured to: when it is needed to change the sequence of the multi-level flow tables, exchange a flow table that needs to be changed and all the forwarding actions corresponding to the flow table, and update the jump flow entries of all the flow tables.

Wherein, in the abovementioned embodiments of the present document, the device further comprises:

a flow table replacing module, configured to: when it is needed to replace the target flow table in the multi-level flow tables, generate a replacement flow table, save a logic rule that needs to be replaced in the replacement flow table, and replace the target flow table with the replacement flow table, then configure the forwarding actions of the logic rules in the replacement flow table, and update the jump flow entries of all the flow tables.

Obviously, the device of the present embodiment corresponds to the multi-level flow table processing method in the embodiment of the present document, and the technical effects achieved in the multi-level flow table processing method can also be achieved by the device of the present embodiment.

It should be understood that those ordinarily skilled in the art can understand that all or some of steps of the abovementioned method may be completed by the programs instructing the relevant hardware, and the programs may be stored in a computer-readable storage medium, such as read only memory, magnetic or optical disk. Alternatively, all or some of the steps of the abovementioned embodiments may also be implemented by using one or more integrated circuits. Accordingly, each module/unit in the abovementioned embodiments may be realized in a form of hardware, or in a form of software function modules. The present document is not limited to any specific form of a combination of hardware and software.

The above description is only preferred embodiments of the present document, it should be pointed out that, for those ordinarily skilled in the art, without departing from the principle of the present document, various improvements and modifications can be made, and these improvements and modifications should be considered within the protection scope of the present document.

INDUSTRIAL APPLICABILITY

The embodiment of the present document can effectively save the TCAM storage space and further save the manufacturing cost of the Openflow switch.

What is claimed is:

1. A flow table multi-leveling method, comprising:
generating a second flow table, separating a target logic rule in a first flow table as well as forwarding actions corresponding to the target logic rule to the second flow table, to make the first flow table and the second flow table orthogonal to form a ternary content addressable memory (TCAM) flow table; wherein the first flow table saves a plurality of logic rules as well as all forwarding actions corresponding to the plurality of logic rules respectively;
continuously generating new flow tables in a same manner of generating the second flow table, until a number of flow tables reaches a preset upper limit.

2. The method of claim 1, wherein, logic rules in the first flow table and the second flow table comprise one or more match fields, and each match field corresponds to one or more forwarding actions;
the step of separating the target logic rule in the first flow table as well as forwarding actions corresponding to the target logic rule to the second flow table comprises:
calculating mapping gains of all logic rules in the first flow table, and determining a logic rule with a maximum mapping gain as the target logic rule;
separating the target logic rule in the first flow table as well as all forwarding actions corresponding to the target logic rule to the second flow table; wherein, a same match field of the target logic rule is not repeatedly saved in the second flow table.

3. The method of claim 2, wherein, continuously generating new flow tables in a same manner of generating the second flow table comprises:
calculating mapping gains of all remaining logic rules in the first flow table, determining a logic rule with a maximum mapping gain in the remaining logic rules in the first flow table as a new target logic rule;
separating the new target logic rule in the first flow table as well as all forwarding actions corresponding to the new target logic rule to a third flow table, to make the first flow table, the second flow table and the third flow table orthogonal to form a TCAM table; wherein a same match field of the target logic rule is not repeatedly saved in the third flow table.

4. The method of claim 3, wherein, the first flow table is configured with a first jump flow entry used for saving a jump address of each forwarding action in the first flow table, the second flow table is configured with a second jump flow entry used for saving a jump address of each forwarding action in the second flow table; wherein, a jump address of the first jump flow entry is the second flow table or a forwarder, a jump address of the second jump flow entry is the forwarder;
after separating the new target logic rule in the first flow table as well as all forwarding actions corresponding to the new target logic rule to the third flow table, the method further comprises:
configuring a third jump flow entry for the third flow table;
configuring a jump address for each forwarding action in the third flow table;
saving the jump address of each forwarding action in the third flow table to the third jump flow entry;
updating jump addresses in the first jump flow entry and the second jump flow entry.

5. The method of claim 4, wherein,
the step of configuring a jump address for each forwarding action in the third flow table comprises:
configuring the jump address of each forwarding action in the third flow table as the forwarder;
the step of updating jump addresses in the first jump flow entry and the second jump flow entry comprises:
updating the jump addresses in the first jump flow entry and the second jump flow entry, to make the jump address of the first jump flow entry be the second flow table or the third flow table or the forwarder, and make the jump address of the second jump flow entry be the third flow table or the forwarder.

6. A multi-level flow table processing method, comprising:
determining a logic rule of a target packet;
matching logic rules saved in each flow table with the logic rule of the target packet based on an order of valid bits to obtain a set of forwarding actions of each flow table consistent with the matching;
taking an intersection of sets of forwarding actions of all the flow tables to obtain common forwarding actions for each set of forwarding actions;
forwarding the target packet based on the common forwarding actions for each set of forwarding actions;
wherein, the multi-level flow tables are sequenced based on the valid bits, the multi-level flow tables are orthogonal to form a ternary content addressable memory (TCAM) flow table; a first flow table at a first level saves at least one logic rule and all forwarding actions corresponding to the at least one logic rule, and each of remaining flow tables only saves one logic rule and all forwarding actions corresponding to the logic rule.

7. The method of claim 6, wherein, the logic rules saved in each flow table comprise one or more match fields, each match field corresponds to one or more forwarding actions; each flow table in the multi-level flow tables is further configured with a jump flow entry used for saving a jump address of each forwarding action in a flow table corresponding to the jump flow entry, thereby after obtaining a set of forwarding actions of the first flow table, it is to jump to a lower-level flow table based on the jump address corresponding to each forwarding action in the set of forwarding actions.

8. A flow table multi-leveling device, comprising: a generating circuitry, configured to: generate a second flow table; and
a separating circuitry, configured to separate a target logic rule in a first flow table as well as forwarding action corresponding to the target logic rule to the second flow table, to make the first flow table and the second flow table orthogonal to form a TCAM flow table; wherein the first flow table saves a plurality of logic rules as well as all forwarding actions corresponding to the plurality of logic rules respectively;
the generating circuitry is further configured to: continuously generate new flow tables in a same manner of generating the second flow table, until a number of flow tables reaches a preset upper limit.

9. The device of claim 8, wherein, logic rules in the first flow table and the second flow table comprise one or more match fields, and each match field corresponds to one or more forwarding actions;
the separating circuitry comprises:
a calculating sub-circuitry, configured to: calculate mapping gains of all logic rules in the first flow table, and determine a logic rule with a maximum mapping gain as the target logic rule; and
a separating sub-circuitry, configured to: separate the target logic rule in the first flow table as well as all forwarding actions corresponding to the target logic rule to the second flow table; wherein, a same match field of the target logic rule is not repeatedly saved in the second flow table.

10. The device of claim 9, wherein,
the calculating sub-circuitry is further configured to: calculate mapping gains of all remaining logic rules in the first flow table, determine a logic rule with a maximum mapping gain in the remaining logic rules in the first flow table as a new target logic rule;
the separating sub-circuitry is further configured to: separate the new target logic rule in the first flow table and all forwarding actions corresponding to the new target logic rule to a third flow table, to make the first flow table, the second flow table and the third flow table orthogonal to form a TCAM table; wherein, a same match field of the target logic rule is not repeatedly saved in the third flow table.

11. The device of claim 10, wherein, the first flow table is configured with a first jump flow entry used for saving a jump address of each forwarding action in the first flow table, the second flow table is configured with a second jump flow entry used for saving a jump address of each forwarding action in the second flow table; wherein, a jump address of the first jump flow entry is the second flow table or a forwarder, and a jump address of the second jump flow entry is the forwarder;
the device further comprises:
a first configuring circuitry: configured to: after the separating circuitry separates the target logic rule in the first flow table as well as all forwarding actions corresponding to the target logic rule to the third flow table, configure a third jump flow entry for the third flow table;
a second configuring circuitry, configured to configure a jump address for each forwarding action in the third flow table;
a saving circuitry, configured to: save the jump address of each forwarding action in the third flow table into the third jump flow entry; and
an updating circuitry, configured to: update jump addresses in the first jump flow entry and the second jump flow entry.

12. The device of claim 11, wherein,
the second configuring circuitry is configured to: configure the jump address of each forwarding action in the third flow table as the forwarder;
the updating circuitry is configured to: update the jump addresses in the first jump flow entry and the second jump flow entry, to make the jump address of the first jump flow entry be the second flow table or the third flow table or the forwarder, and make the jump address of the second jump flow entry be the third flow table or the forwarder.

13. A multi-level flow table processing device, wherein, the device comprises:
a determining circuitry, configured to determine a logic rule of a target packet;
a matching circuitry, configured to match logic rules saved in each flow table with the logic rule of the target packet based on an order of valid bits to obtain a set of forwarding actions of each flow table consistent with the matching;
a processing circuitry, configured to take an intersection of sets of forwarding actions of all the flow tables to obtain common forwarding actions for each set of forwarding actions; and
a forwarding circuitry, configured to forward the target packet based on the common forwarding actions for each set of forwarding actions;
wherein, the multi-level flow tables are sequenced based on the valid bits and are orthogonal to form a ternary content addressable memory (TCAM) flow table; wherein, a first flow table at a first level saves at least one logic rule and all forwarding actions corresponding to the at least one logic rule, and each of remaining flow tables only saves one logic rule and all forwarding actions corresponding to the logic rule.

14. The device of claim 13, wherein, the logic rules saved in each flow table comprise one or more match fields, each match field corresponds to one or more forwarding actions; each flow table in the multi-level flow tables is further configured with a jump flow entry used for saving a jump address of each forwarding action in a flow table corresponding to the jump flow entry, thereby after obtaining a set of forwarding actions of the first flow table, the matching circuitry can jump to a lower-level flow table based on the jump address corresponding to each forwarding action in the set of forwarding actions.

* * * * *